US012806941B2

(12) United States Patent
Bill et al.

(10) Patent No.: US 12,806,941 B2
(45) Date of Patent: Nov. 24, 2026

(54) METHOD AND CONTROLLER FOR AN AIRCRAFT

(71) Applicant: Airbus Operations Limited, Bristol (GB)

(72) Inventors: Andrew Bill, Filton (GB); Michael Orford, Filton (GB); Sukhpreet Black, Filton (GB); Rodrigo Jimenez, Filton (GB)

(73) Assignee: Airbus Operations Limited, Filton Bristol (GB)

( * ) Notice: Subject to any disclaimer, the term of this patent is extended or adjusted under 35 U.S.C. 154(b) by 111 days.

(21) Appl. No.: 18/897,665

(22) Filed: Sep. 26, 2024

(65) Prior Publication Data

US 2025/0108671 A1 Apr. 3, 2025

(30) Foreign Application Priority Data

Sep. 28, 2023 (GB) ..................................... 2314893

(51) Int. Cl.
*B60C 23/04* (2006.01)
*B64D 45/00* (2006.01)

(52) U.S. Cl.
CPC .......... *B60C 23/0486* (2013.01); *B64D 45/00* (2013.01); *B60C 2200/02* (2013.01)

(58) Field of Classification Search
CPC . B60C 23/0486; B60C 2200/02; B60C 23/04; B60C 23/068; B60C 23/02; B60C 23/06; B64D 45/00; G01G 19/07; G01G 19/08
See application file for complete search history.

(56) References Cited

U.S. PATENT DOCUMENTS

| | | | | |
|---|---|---|---|---|
| 2010/0185413 | A1 | 7/2010 | Vetsch | |
| 2014/0005956 | A1 | 1/2014 | Patel et al. | |
| 2017/0315014 | A1* | 11/2017 | Regan | B64D 11/06 |
| 2017/0326927 | A1 | 11/2017 | Bill et al. | |
| 2021/0237896 | A1* | 8/2021 | Bill | H04W 4/38 |
| 2022/0306286 | A1* | 9/2022 | Parker | B64C 17/02 |
| 2023/0226859 | A1 | 7/2023 | Bill et al. | |
| 2024/0375769 | A1* | 11/2024 | Kim | B60P 1/62 |

FOREIGN PATENT DOCUMENTS

| | | | |
|---|---|---|---|
| CA | 2308880 | A1 | 11/2001 |
| GB | 2550174 | A | 11/2017 |
| GB | 2614881 | A | 7/2023 |

OTHER PUBLICATIONS

United Kingdom Search Report for corresponding United Kingdom Patent Application No. 2314893.5 dated Mar. 17, 2024.

* cited by examiner

*Primary Examiner* — Brian Wilson
(74) *Attorney, Agent, or Firm* — Greer, Burns & Crain, Ltd.

(57) ABSTRACT

A computer-implemented method comprising determining, based on a first signal indicative of a pressure in a tire of a wheel of an aircraft and a second signal indicative of a deformation of the tire, a determined load on the wheel, and causing an action to be performed based on the determined load on the wheel. Also a system for an aircraft, the system comprising a monitoring system configured to detect pressure and deformation of a tire of a wheel of the aircraft, and a controller configured to determine, on the basis of the pressure and deformation detected by the monitoring system, load on the wheel.

22 Claims, 9 Drawing Sheets

METHOD AND CONTROLLER FOR AN AIRCRAFT

CROSS-REFERENCES TO RELATED APPLICATIONS

This application claims the benefit of Great Britain Patent Application Number 2314893.5 filed on Sep. 28, 2023, the entire disclosure of which is incorporated herein by way of reference.

FIELD OF THE INVENTION

The present invention relates to determining load on an aircraft.

BACKGROUND OF THE INVENTION

Accurate determination of load and load distribution on an aircraft may help to maintain safe aircraft operation. For example, loading an aircraft evenly about a central longitudinal axis may assist with handling of the aircraft both on the ground and in flight. For example, some aircraft may be more susceptible than others to tipping towards a tail end of the aircraft during loading or unloading of passengers and cargo. Loading or unloading processes for such aircraft may thus be important to reduce a risk of inadvertent tipping.

SUMMARY OF THE INVENTION

A first aspect of the present invention provides a computer-implemented method (referred to hereinafter as ‘the method’) comprising: determining, on the basis of a first signal indicative of a pressure in a tire of a wheel of an aircraft and a second signal indicative of a deformation of the tire, a determined load on the wheel, and causing an action to be performed on the basis of the determined load on the wheel.

Some methods for determining load on a wheel may be based on strain measured by a strain gauge on a landing gear strut. However, the accuracy of such strain measurements can be adversely affected by stiction in the landing gear strut such that changes in load are not recorded until the stiction is overcome. In addition, differing loads on the wheels of the same landing gear cannot be determined.

It has been found that load on a wheel may be more accurately determined on the basis of a relationship between pressure in a tire of the wheel and deformation of the tire. As load on a wheel changes, the tire is compressed which may cause pressure in the tire to increase and/or the tire to deform compared to a shape of the tire when the aircraft is unloaded. ‘Unloaded’ is intended to be defined as a condition of the aircraft whereby no cargo, passengers or fuel are loaded onto the aircraft. The method may allow for substantially real-time determination of load on the wheel. By basing the determination on both tire pressure and tire deformation, load on the wheel can be determined more accurately than basing the determination on only one of tire pressure and tire deformation, because such parameters may individually be influenced by other factors. For example, tire pressure may change due to a change in ambient temperature without there being a change in load on the wheel.

The determining may be performed on board the aircraft or remote from the aircraft. Optionally, the determining is performed by a controller. The controller may comprise, or be in communication with, a model. The model may comprise a computer model, such as a digital twin, of the wheel, a landing gear comprising the wheel, and/or an aircraft comprising the wheel. The controller may comprise a machine learning model configured to perform the determining. The machine learning model may be comprised in a system of the aircraft.

Optionally, the method is performed when the aircraft is stationary on the ground. Optionally, the method is performed during loading and/or unloading of the aircraft, for example loading and/or unloading of passengers, cargo and/or fuel.

Optionally, the method comprises generating a wheel load signal indicative of the determined load on the wheel. Optionally, the action is performed on the basis of the wheel load signal.

Optionally, the method comprises sensing pressure in the tire and generating the first signal on the basis of the sensed pressure. Directly sensing pressure in the tire may permit a more accurate and rapid determination of determined load on the wheel.

Optionally, the sensing pressure is performed by a pressure sensor. The pressure sensor may be an analogue sensor. The pressure sensor may be located in the tire. The pressure sensor may be in wired communication with a controller configured to determine the determined load.

Optionally, the method comprises sensing deformation of the tire and generating the second signal on the basis of the sensed deformation of the tire. Directly sensing deformation may permit a more accurate and rapid determination of determined load on the wheel.

Optionally, the sensed deformation of the tire is relative to a shape of the tire when the aircraft is unloaded.

Optionally, the sensing deformation of the tire comprises sensing deflection of the tire relative to a surface on which the tire is located, and the second signal is indicative of the sensed deflection of the tire.

Optionally, the sensing deformation is performed by a proximity sensor. The proximity sensor may be configured to detect a distance between a predefined point on the wheel and the ground. The proximity sensor may be configured to detect a change in tire width compared to when the aircraft is unloaded.

Optionally, the sensing deformation is performed by a vision-based sensor, such as one or more of a camera, a laser and a Lidar system. Such sensors may be comprised in some existing aircraft. It has been found that such vision-based sensors may be employed to detect tire deformation. Accordingly, the method may be implemented on such an aircraft without the need for new hardware.

Optionally, the method comprises determining the determined load on the wheel on the basis of a third signal indicative of a temperature of the tire. This may provide a more accurate result because temperature in a tire may affect how the tire responds to load on the wheel. For example, at higher temperatures the tire may be more pliable and thus deform more than at lower temperatures, for the same load on the wheel. For example, at higher temperatures pressure in the tire may be greater than at lower temperatures, for the same load on the wheel.

Optionally, the method comprises sensing a temperature of the tire and generating the third signal on the basis of the sensed temperature. The temperature may be a temperature of gas in the tire or a temperature at an inner wall of the tire. A sensor for sensing temperature of the tire may be located within the tire.

Optionally, the method comprises determining the determined load on the wheel on the basis of a fourth signal indicative of a parameter, wherein fluctuations in the parameter influence tire pressure and/or tire deformation. This may increase the accuracy of the determined load on the wheel.

Optionally, the parameter is indicative of: tire condition, ambient temperature, aircraft unloaded mass and aircraft geometry.

Optionally, the model comprises data indicative of a condition of the tire such as wear on the tire, whether the tire has been re-treaded and a position of the tire on the aircraft. The model may be configured to determine an expected pressure and deformation of the tire when the aircraft is unloaded on the basis of the parameter.

Optionally, the method comprises comparing the determined load on the wheel to a reference wheel load. Optionally, the method comprises generating a signal indicative of the determined load on the wheel relative to the reference wheel load. Optionally, the action is performed on the basis of the signal indicative of the determined load on the wheel relative to the reference wheel load.

Optionally, the reference wheel load is a maximum wheel load above which the wheel should not be loaded. Optionally, the method comprises determining whether the determined load on the wheel exceeds the maximum wheel load. This may help to prevent overloading of the wheel, for example due to uneven loading of the aircraft.

Optionally, the reference wheel load is a minimum wheel load below which load on the wheel would not be expected to fall. Optionally, the method comprises determining whether the determined load on the wheel is below the minimum wheel load. This may help to indicate uneven loading of the aircraft.

Optionally, the method comprises determining a determined load on a plurality of wheels of the aircraft, on the basis of respective first signals indicative of a pressure in a tire of each respective wheel of the plurality of wheels and respective second signals indicative of a deformation of each respective tire of each wheel of the plurality of wheels, wherein the plurality of wheels comprises the wheel. This may allow a determination of load distribution across the plurality of wheels. Optionally, the method comprises causing the action to be performed on the basis of the determined load on each wheel of the plurality of wheels.

Optionally, the action comprises updating a plan for an aircraft loading or unloading process on the basis of a determination made during the method. Optionally, the action comprises causing a member of ground crew for the aircraft to manually update a plan for an aircraft loading or unloading process on the basis of a determination made during the method. Optionally, updating the plan comprises modifying a recommended aircraft loading or unloading action of the process, on the basis of a determination made during the method.

Optionally, the action comprises automatically updating a schedule for maintenance of the aircraft on the basis of a determination made during the method. Optionally, the action comprises causing a member of ground crew for the aircraft to manually update a schedule for maintenance of the aircraft on the basis of a determination made during the method.

Optionally, the action comprises storing data received during the method and/or data indicative of a determination made during the method in a memory local to the aircraft and/or a memory remote from the aircraft. The data may be accessible by a digital model of the aircraft, for example a machine learning model, and may be used to update the model.

Optionally, the action comprises causing load on the aircraft to be redistributed on the basis of a determination made during the method. For example, cargo, fuel and/or passengers may be redistributed on the basis of the determination during the method.

Optionally, the action comprises transmitting one or more signals indicative of determinations made during the method and/or transmitting one or more signals generated during the method, to one or more systems of the aircraft and/or systems remote from the aircraft.

The one or more systems of the aircraft may comprise an aircraft braking system and/or an aircraft steering system. The aircraft braking system and/or the aircraft steering system may be configured to compensate respective braking or steering of the aircraft on the basis of determinations made during the method.

The one or more systems remote from the aircraft may comprise a ground crew system accessible by ground crew responsible for maintaining and/or loading and unloading the aircraft. The ground crew system may comprise a user interface and, on the basis of one or more of the signals, the user interface may be configured to display a visual indication indicative of an action to be performed by the ground crew. For example, the action to be performed may comprise one or more of: checking the pressure and/or integrity of the tire, wheel and/or landing gear, redistributing load on the aircraft and manually modifying an aircraft loading or unloading process.

The one or more systems remote from the aircraft may comprise an aircraft maintenance scheduling system and the aircraft maintenance scheduling system may be configured, on the basis of one or more of the signals, to automatically update a maintenance schedule for the aircraft.

The one or more systems remote from the aircraft may comprise an aircraft loading or unloading system and the aircraft loading or unloading system may be configured, on the basis of the one or more signals, to automatically modify a plan for an aircraft loading or unloading process.

Optionally, the plurality of wheels comprises all wheels of a landing gear of the aircraft and method comprises determining, on the basis of the determined load on each wheel of the landing gear, a determined total load on the landing gear. Some methods of determining load on a landing gear may comprise sensing strain on a strut of a landing gear. However, the accuracy of such systems may be limited, for example due to stiction at the strut. The method may overcome such limitations because the tires of a landing gear are where load on the landing gear is translated to the ground, and pressure and deformation of the tires is directly affected by changes in load on the landing gear. The method may comprise generating a landing gear load signal indicative of the determined total load on the landing gear. Optionally, the method comprises causing the action to be performed on the basis of the determined total load on the landing gear and/or on the basis of the landing gear load signal.

Optionally, the method comprises comparing the determined load on one wheel of the landing gear to the determined load on at least one other wheel of the landing gear. This may permit identification of uneven loading on the wheels of the landing gear, which in turn may be, for example, indicative of one or more of: an underinflated tire, an overinflated tire, tire degradation, and a structural issue with the landing gear. Optionally, the method comprises causing the action to be performed on the basis of the comparing of the determined load on one wheel of the landing gear to the determined load on at least one other wheel of the landing gear.

Optionally, the method comprises comparing the determined total load on the landing gear to a predetermined landing gear load threshold. This may permit identification of overloading or underloading of the landing gear. The method may comprise generating a landing gear load threshold signal indicative of load on the landing gear relative to the predetermined landing gear load threshold. Optionally, the method comprises causing the action to be performed on the basis of the comparing of the determined total load on the landing gear to a predetermined landing gear load threshold.

Optionally, the landing gear is a nose landing gear of the aircraft. A tilt condition is when an aircraft tends towards standing on a tail of the aircraft. As an aircraft approaches a tilt condition, the wheels of the nose landing gear become unloaded. Reducing load on the wheels can be determined using the method because deformation and pressure in the tires of the wheels reduces as the nose landing gear becomes unloaded. Accordingly, load on a nose landing gear of an aircraft may be indicative of whether the aircraft is approaching a tilt condition.

Optionally, the method comprises generating a tilt warning signal in the event that the determined total load on the nose landing gear falls below a threshold nose landing gear load, the tilt warning signal being indicative that the aircraft is approaching a tilt condition.

Optionally, the plurality of wheels comprises all wheels a first main landing gear of the aircraft and all wheels of a second main landing gear of the aircraft. The first and second main landing gears may be on opposing sides of a central longitudinal axis of the aircraft, and the method may comprise; determining, on the basis of the determined load on each wheel of the first main landing gear, a determined total load on the first main landing gear; determining, on the basis of the determined load on each wheel of the second main landing gear, a determined total load on the second main landing gear; comparing the determined total load on the first main landing gear to the determined total load on the second main landing gear, and causing the action to be performed on the basis of the comparing of the determined total load on the first main landing gear to the determined total load on the second main landing gear.

For an evenly loaded aircraft, load on the first main landing gear would be expected to be substantially equal to load on the second main landing gear at any given point in time. Accordingly, a difference between the determined total load on the first main landing gear to the determined total load on the second main landing gear may be indicative that load to the left and right of the central longitudinal axis is uneven.

Optionally, the method comprises determining a difference between the determined total load on the first main landing gear to the determined total load on the second main landing gear and comparing the difference to a threshold main gear difference. The threshold main gear difference may be a maximum permissible difference between the determined total load on the first main landing gear and the determined total load on the second main landing gear. For example, with a difference above the threshold main gear difference, aircraft handling may be adversely affected.

Optionally, the method comprises generating a main gear differential signal in the event that the difference between the determined total load on the first main landing gear and the determined total load on the second main landing gear meets or exceeds the threshold main gear difference. The main gear differential signal may be indicative of a magnitude of the difference between the determined total load on the first main landing gear and the determined total load on the second main landing gear and/or that the threshold main gear difference has been exceeded.

Optionally, the method comprises causing the action to be performed on the basis of the difference between the determined total load on the first main landing gear to the determined total load on the second main landing gear, the comparing of the difference to the threshold main gear difference and/or the main gear differential signal.

Optionally, the plurality of wheels comprises all wheels of the aircraft.

Optionally, the method comprises determining, on the basis of the determined load on each wheel of the aircraft, a respective determined total load on each landing gear of the aircraft. Optionally, the method comprises causing the action to be performed on the basis of the determined total load on each landing gear.

Optionally, the aircraft comprises a nose landing gear and at least two main landing gears positioned aft of the nose landing gear, and the method comprises comparing the determined total load on the nose landing gear to the determined total load on one or each of the at least two main landing gears. This may enable identification that the aircraft is approaching a tilt threshold. As an aircraft approaches a tilt condition, a change in load on the nose landing gear may differ compared to a change in load on the main landing gears over the same time period. For example, during loading of an aircraft, the load on the nose landing gear may not increase in line with an increase in the load on the main nose landing gear in the event that the aircraft is approaching a tilt condition. For example, load on the nose landing gear may increase more slowly than load on the main landing gear, or load on the nose landing gear may remain constant or may even decrease. Accordingly, an increase in pressure and deformation of the tires of the main landing gear, which is not accompanied by an associated increase in pressure and deformation of the tires of the nose landing gear may be indicative that the aircraft is approaching a tilt condition. The method may thus allow detection of an approaching tilt condition more accurately than methods that rely on determining load based on strain in a landing gear strut, which may suffer from stiction and therefore may take longer in determining that the aircraft is approaching a tilt condition.

Optionally, the method comprises comparing a difference between the determined total load on the nose landing gear and the determined total load on one or each of the main landing gears to a threshold nose gear difference. The method may comprise generating a nose lift signal in the event that the difference between the determined total load on the nose landing gear and the determined total load on the one or each of the main landing gears exceeds the threshold nose gear difference. Optionally, the method comprises causing the action to be performed on the basis of the comparing of the determined total load on the nose landing gear to the determined total load on each of the at least two main landing gears, the comparing the difference between the determined total load on the nose landing gear and the determined total load on one or each of the main landing gears to a threshold nose gear difference and/or the nose lift signal.

Optionally, the method comprises determining, on the basis of the determined load on each wheel of the aircraft, a determined total load on the aircraft. Optionally, the method comprises determining, on the basis of the determined load on each landing gear of the aircraft, a determined total load on the aircraft. This may allow identification of when the aircraft is approaching, or has reached, a maximum allowable aircraft weight for the aircraft. The method may comprise generating an aircraft load signal indicative of a magnitude of the determined total load and/or indicative of whether the determined aircraft total load exceeds an aircraft load threshold. The aircraft load threshold may be a maximum weight of the aircraft for flight. Optionally, the method comprises causing the action to be performed on the basis of the determined total load on the aircraft and/or the aircraft load signal.

Optionally, the method comprises determining, on the basis of the determined load on each wheel of the aircraft, a load distribution of the aircraft. Optionally, the method comprises determining, on the basis of the determined load on each landing gear of the aircraft, a load distribution of the aircraft. This may allow identification of uneven loading of the aircraft. The method may comprise generating a load distribution signal indicative of the load distribution. Optionally, the method comprises causing the action to be performed on the basis of the load distribution of the aircraft and/or the load distribution signal.

Optionally, the method comprises determining, on the basis of the determined load on each wheel of the aircraft, a determined center of gravity of the aircraft. Optionally, the method comprises determining, on the basis of the determined load on each landing gear of the aircraft, a determined center of gravity of the aircraft. This may allow identification of uneven loading of the aircraft. The method may comprise generating an aircraft center of gravity signal indicative of the determined center of gravity of the aircraft.

Optionally, determining the determined center of gravity of the aircraft is on the basis of one or more of: a mass of the aircraft when unloaded and geometry of the aircraft.

Optionally, the method comprises determining a lateral distance between the determined center of gravity of the aircraft and the central longitudinal axis of the aircraft. Optionally, the method comprises determining whether the lateral distance exceeds a lateral threshold. This may allow identification of loading to the left or right side of the central longitudinal axis of the aircraft being different to loading to the other side of the central longitudinal axis.

Optionally, the method comprises generating a lateral load warning signal in response to a determination that the lateral distance exceeds the lateral threshold. Optionally, the method comprises causing the action to be performed on the basis of the determined center of gravity of the aircraft, the center of gravity signal, the lateral distance between the determined center of gravity of the aircraft and the central longitudinal axis of the aircraft, the lateral distance exceeding the lateral threshold and/or the lateral load warning signal.

Optionally, the method comprises comparing the determined center of gravity to a longitudinal threshold position, the longitudinal threshold position aft of a theoretical center of gravity of the aircraft. Optionally, the method comprises determining whether the determined center gravity is aft of the longitudinal threshold position. The theoretical center of gravity may be a position along the central longitudinal axis of the aircraft at which the center of gravity would be expected to be when the aircraft is empty and/or when load on the aircraft is correctly distributed. The longitudinal threshold position may be a position along the central longitudinal axis of the aircraft whereby, if the center of gravity of the aircraft is aft of the longitudinal threshold position, the aircraft may be at risk of tilt. The theoretical center of gravity and the longitudinal threshold position may be stored in a memory, or may be determined by a neural network. The method may thus detect whether the aircraft is approaching a tilt condition.

Optionally, the method comprises generating a tilt warning signal in the event that the determined center of gravity is aft of the longitudinal threshold position. Optionally, the method comprises causing the action to be performed on the basis of the determining the determined center of gravity relative to the longitudinal threshold position and/or the tilt warning signal.

Optionally, the method is performed when the aircraft is stationary on the ground. Optionally, the method is performed by an aircraft control system, for example an on-board aircraft control system.

Optionally, the method is performed at regular intervals. The regular intervals may have a duration in the region of from 0.5 seconds to 1 minute.

Optionally, the action comprises storing, in a memory, data indicative of any signal received during the method, any determination or comparison performed during the method and/or any signal generated or transmitted during the method.

A second aspect of the present invention provides a system for an aircraft, the system comprising a monitoring system configured to detect pressure and deformation of a tire of a wheel of the aircraft, and a controller configured to determine, on the basis of the pressure and deformation detected by the monitoring system, load on the wheel. It has been found that load on a wheel may be more accurately determined on the basis of a relationship between pressure in a tire of the wheel and deformation of the tire, as described above.

Optionally, the controller is configured to cause the system to output a signal indicative of the load on the wheel determined by the controller. Optionally, the system comprises a memory configured to store data indicative of the load on the wheel determined by the controller.

Optionally, the monitoring system is configured to detect pressure and deformation of a tire of each wheel of a landing gear of the aircraft, and the controller is configured to: determine, on the basis of the pressure and deformation detected by the monitoring system for each tire, a determined load on each wheel of the landing gear, and determine a determined total load on the landing gear.

Optionally, the controller is configured to compare the determined total load on the landing gear to a threshold landing gear load. Optionally, the controller is configured to cause the system to output a landing gear load signal indicative of the determined total load on the landing gear and/or a difference between the determined total load on the landing gear and the threshold landing gear load.

Optionally, the landing gear is a nose landing gear of the aircraft. Optionally, the controller is configured to cause the system to output a nose lift signal in the event that the determined total load on the landing gear falls below a minimum nose load threshold.

Optionally, the system is configured to detect pressure and deformation of a tire of each wheel of the aircraft and the controller is configured to determine a determined load on each wheel of the aircraft.

Optionally, the controller is configured to determine, on the basis of the determined load on each wheel of the aircraft, a determined center of gravity of the aircraft.

Optionally, the controller is configured to determine, on the basis of the determined load on each wheel of each landing gear, a determined total load on each landing gear of the aircraft.

Optionally, the controller is configured to determine, on the basis of the determined total load on each landing gear of the aircraft, a determined center of gravity of the aircraft.

Optionally, the controller is configured to compare the determined center of gravity to a theoretical center of gravity of the aircraft, and to cause the system to output a signal indicative of a position of the determined center of gravity relative to the theoretical center of gravity. The theoretical center of gravity may be a position along the central longitudinal axis of the aircraft at which the center of gravity would be expected to be when the aircraft is empty and/or when load on the aircraft is correctly distributed. The theoretical center of gravity may be determined by a neural network. The theoretical center of gravity may be stored in a memory accessible by the controller.

Optionally, the system is configured to output a main landing gear differential signal indicative that the determined center of gravity is at least a predetermined distance to the left of right of the theoretical center of gravity.

Optionally, the system is configured to output a tilt warning signal indicative that the determined center of gravity if at least a predetermined distance aft of the theoretical center of gravity.

Optionally, the monitoring system comprises a, or a plurality of, tire deformation sensor(s) to detect deformation in each tire of the plurality of wheels. The monitoring system may comprise a separate deformation sensor for each tire of the plurality of wheels. Alternatively, a single deformation sensor may be configured to detect deformation in more than one of the plurality of wheels, for example a single deformation sensor may be configured to simultaneously detect deformation in two of the wheels of a landing gear of the aircraft.

Optionally, the tire deformation sensor(s) comprise vision-based sensors and the controller comprises a processor configured to process images captured by the vision-based sensors to determine deformation of the tire. Optionally the vision-based sensors comprise one or more of: a camera, a laser and a Lidar system.

Optionally, the monitoring system comprises a, or a plurality of, pressure sensor(s), each pressure sensor associated with a respective wheel of the aircraft and configured to sense pressure in the tire of the respective wheel.

Optionally, the monitoring system comprises a, or a plurality of, temperature sensor(s), each temperature sensor associated with a respective wheel of the aircraft and configured to sense temperature in the tire of the respective wheel, and the system is configured to determine the load on the wheel(s) on the basis of the temperature sensed by the respective temperature sensor.

Optionally, the system is configured to perform any computer-implemented method according to the first aspect.

A third aspect of the present invention provides a non-transitory storage medium storing machine-readable instructions which, when executed by a controller, cause the controller to initiate a method according to the first aspect.

Optionally, the controller is the controller of the second aspect.

A fourth aspect of the present invention provides an aircraft comprising at least one landing gear, each landing gear comprising at least one wheel having a tire, and one or more of: a system according to the second aspect, and a non-transitory storage medium according to the third aspect.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
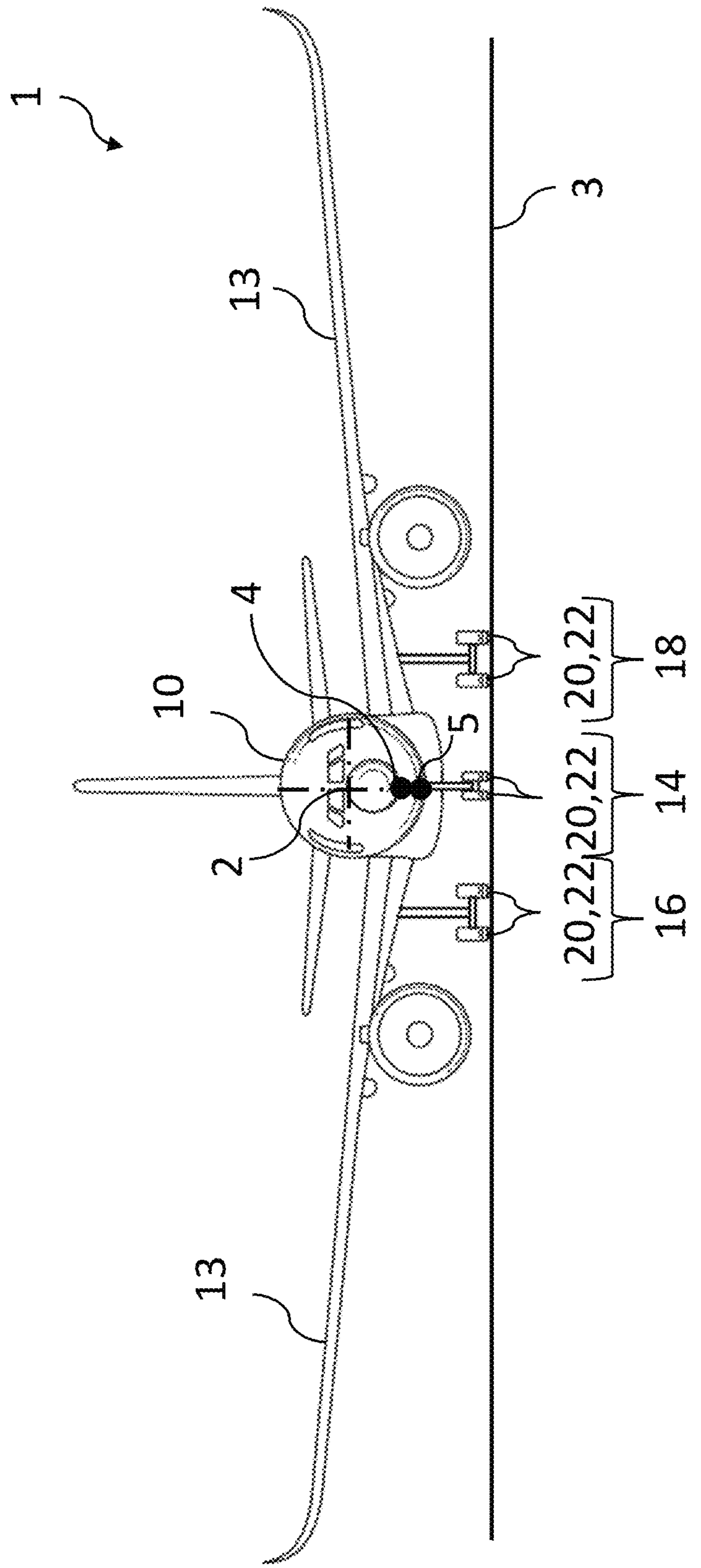
FIG. 1 shows a schematic front view of an aircraft according to an example.

FIGS. 1-3 and 6 show an aircraft 1 according to an example. In FIG. 1, the aircraft 1 is on the ground 3 and is unloaded. That is, no passengers, cargo or fuel are loaded onto the aircraft 1.

The aircraft 1 comprises a fuselage 10, having a nose end 11 and a tail end 12 opposite the nose end 11 along the central longitudinal axis 2. Wings 13 extend from opposing sides of the fuselage. A nose landing gear 14, a first main landing gear 16 and a second main landing gear 18 (collectively referred to herein as the landing gears 14, 16, 18) are selectively extendable from a belly 19, or underside, of the fuselage 10. The first and second main landing gears 16, 18 are positioned aft of the nose landing gear 14 and to opposing sides of a central longitudinal axis 2. Each landing gear 14, 16, 18 comprises a plurality of wheels 20 each having a tire 22. In this example, the nose landing gear 14 comprises two wheels, and each of the main landing gears 16, 18 comprises four wheels. It will be appreciated that in other examples, an aircraft may have a different number of main landing gears, for example three or four, and that each landing gear may have a different number of wheels to the present example. In other envisaged examples, the first and second main landing gears 16, 18 are selectively extendable from the wings 13 or from the wings 13 and the fuselage 10.

When the aircraft 1 is on the ground 3, the landing gears 14, 16, 18 are each in respective extended positions and together support the weight of the aircraft 1. The wheels 20, and more specifically the tires 22, of each landing gear 14, 16, 18 share the weight supported by the respective landing gear 14, 16, 18. Load on each landing gear 14, 16, 18, and thus on each wheel 20, is directly affected by the weight of the aircraft 1, which changes during loading and unloading of the aircraft 1. Fuel, passengers and cargo are typically loaded onto, and unloaded from, an aircraft. In this example, fuel is stored in tanks (not shown) located in the wings 13 and fuselage 10 of the aircraft 1, cargo is stored in a hold (not shown) towards the belly 19 of the fuselage, and passengers travel in a passenger compartment (not shown) above the hold.

The unloaded center of gravity 4 of an aircraft is where the center of gravity of the aircraft lies when the aircraft is unloaded. The unloaded center of gravity 4 is aircraft-specific, dependent on aircraft geometry and configuration. When the aircraft 1 of this example is unloaded, the unloaded center of gravity 4 of the aircraft 1 lies at a center of the fuselage 10, as viewed from the nose end 11 or tail end 12 of the fuselage 10, and is approximately in line with the wings 13 along a length of the aircraft 1. When the aircraft 1 is loaded, a desirable position for a loaded center of gravity 5 of the aircraft is at the center of the fuselage 10 and approximately in line with the wings 13 along the length of the aircraft 1, though lower to the ground 3 than the unloaded center of gravity 4, as shown in FIG. 1. An incorrectly loaded aircraft 1 may cause the loaded center of gravity 5 to deviate from said desirable position. It is desirable to detect that the loaded center of gravity 5 has deviated from the desirable position because this may adversely affect aircraft handling.

Figure 2:
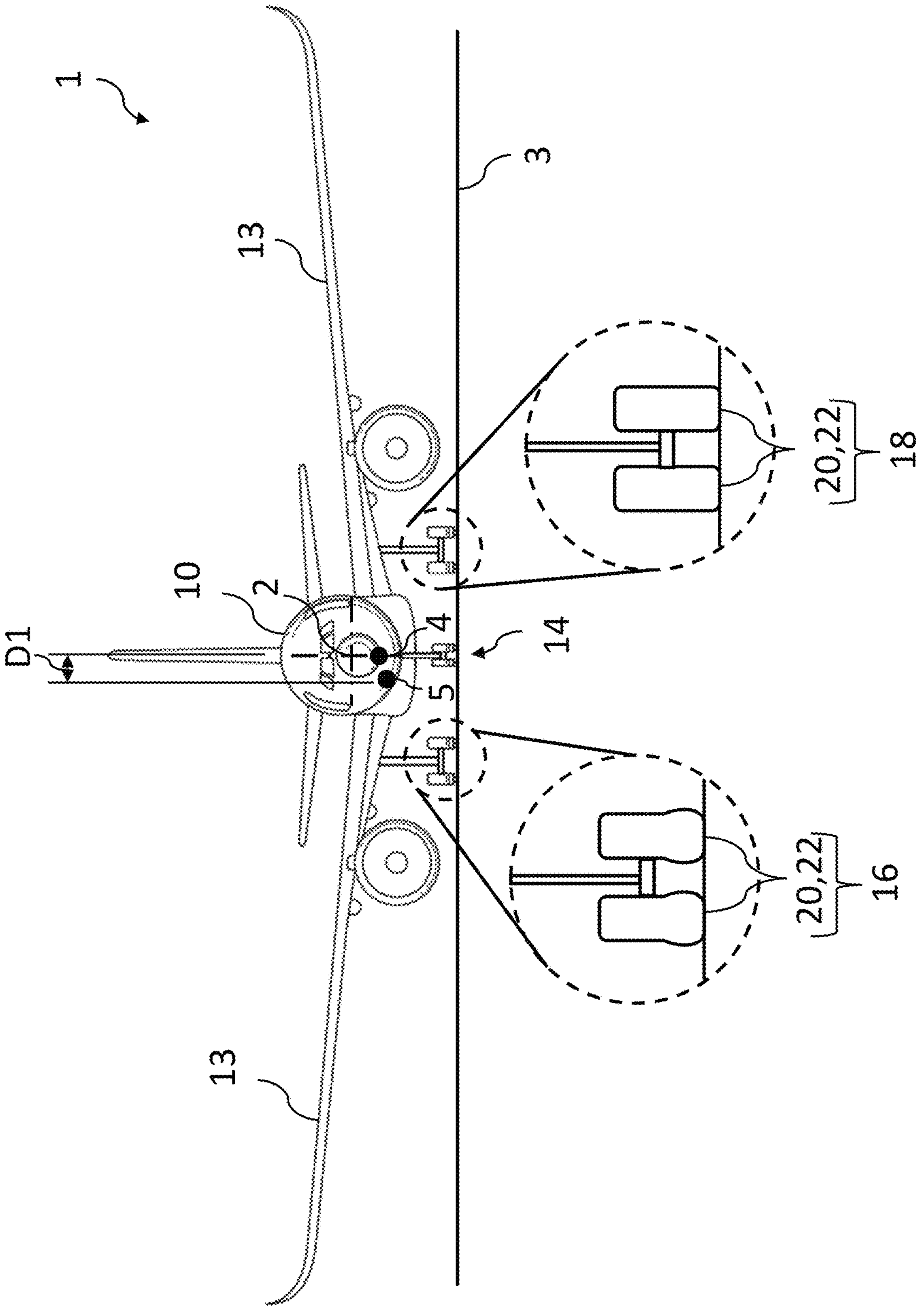
FIG. 2 shows a schematic front view of the aircraft of FIG. 1, in which the aircraft is unevenly loaded towards a side of the aircraft.

FIG. 2 shows the aircraft 1 during an example loading process. More fuel has been loaded into the tank(s) in one of the wings 13 than into the tank(s) in the opposing wing 13 such that aircraft loading is uneven about a central longitudinal axis 2 of the aircraft. Accordingly, the loaded center of gravity 5 has moved away from the center of the fuselage 10 by a lateral distance D1 and the aircraft is prone to aircraft roll about an axis parallel to the central longitudinal axis 2. Load supported by the first main landing gear 16 is greater than load supported by the second main landing gear 18. During a flight cycle of the aircraft 1, the aircraft roll may affect steering and/or braking of the aircraft 1, for example constant flight control input may be required to correct for aircraft turning induced by the uneven fuel loading.

Figure 3:
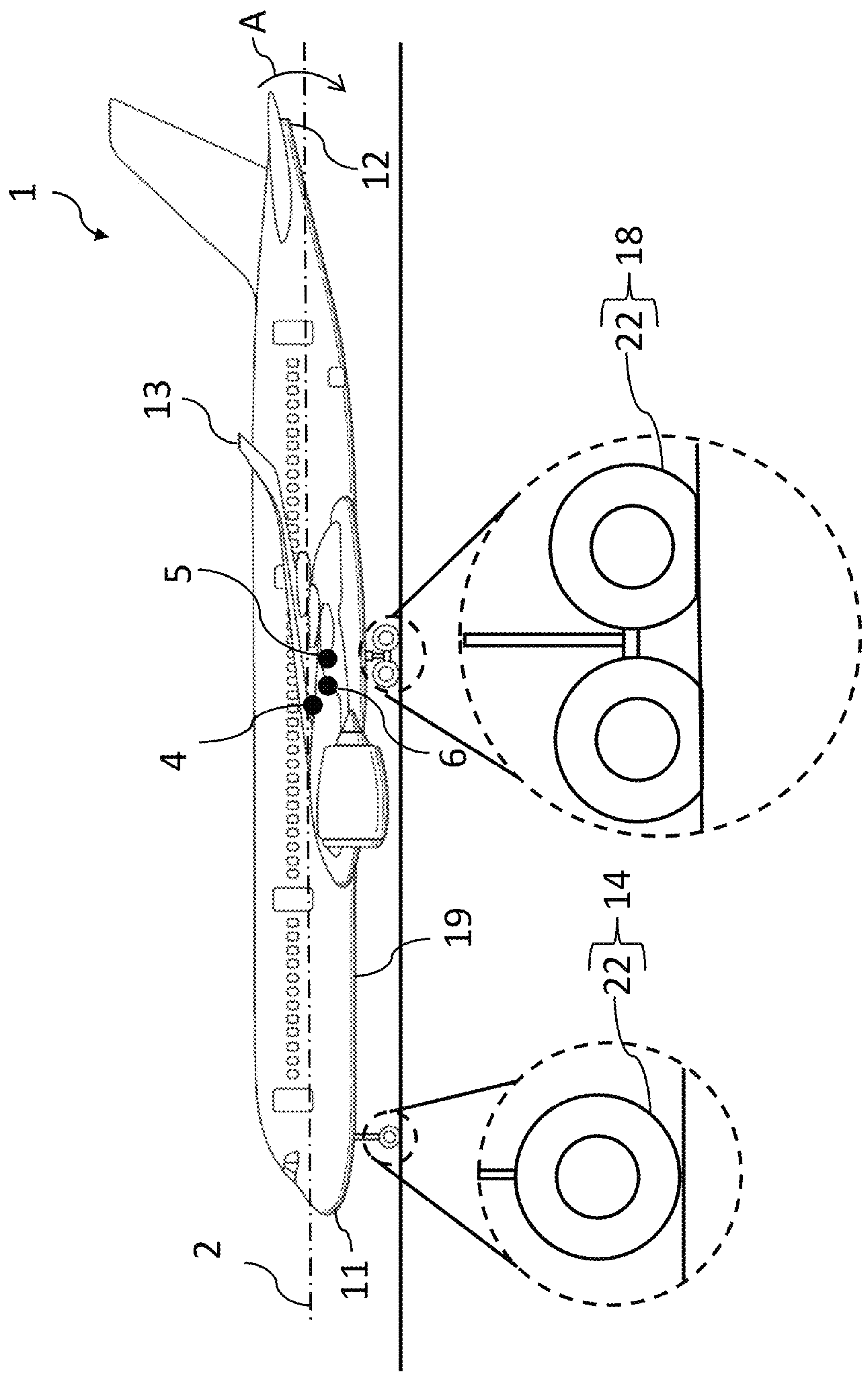
FIG. 3 shows a schematic side view of the aircraft of FIG. 1, in which the aircraft is approaching a tilt condition.

FIG. 3 shows the aircraft 1 during an example loading process. Cargo has been loaded only into the hold aft of the main landing gears 16, 18. Accordingly, the loaded center of gravity 5 has moved aft of the desired position along the length of the aircraft 1 and the aircraft 1 is approaching a tilt condition. In the tilt condition, the aircraft 1 is prone to tip backward onto its tail 12 about the main landing gears 16, 18, as denoted by the arrow A in FIG. 3. Load on the main landing gears 16, 18 is increasing whilst load on the nose landing gear 14 is decreasing. During a flight cycle of the aircraft 1, reduced load on the nose landing gear 14 may affect steering of the aircraft 1.

Deviation of the loaded center of gravity 5 from the desirable position may be determined in some existing aircraft by measuring strain in a strut of each landing gear and comparing the strain in each landing gear to one another to determine how the aircraft weight is distributed across the landing gears. Alternatively, the strain in each landing gear may be used to calculate load on each landing gear and the load on each landing gear may be compared to the load on the other landing gears to determine how the aircraft weight is distributed across the landing gears. However, movement of a landing gear strut may be inhibited by friction and/or stiction such that some changes in load on the landing gear may not translate to a change in measured strain in the strut. Accordingly, the accuracy and immediacy of such determinations may be limited.

Disclosed herein are example aircraft controllers, aircraft systems, computer-implemented methods and an aircraft 1 that enable determination, such as in real-time, of load on wheels of the aircraft 1 and, in turn, determination of a deviation of the loaded center of gravity 5 of the aircraft 1 from the desirable position. The disclosed aircraft controllers, aircraft systems, computer-implemented methods and aircraft 1 may help to overcome the aforementioned limitations of determining deviation of the loaded center of gravity 5 from the desirable position on the basis of strain in a strut of each landing gear. The disclosed aircraft controllers, aircraft systems, computer-implemented methods and aircraft 1 may also enable detection of over- or under-loading of wheels of an aircraft.

It has been found that load on a wheel 20 of an aircraft can be determined based on pressure in the tire 22 of the wheel 20 and deformation of the tire 22, since a tire can be assumed to have a substantially constant volume and gas volume. In turn, landing gear- or aircraft-level load can be determined. It has also been found that a more accurate determination can be performed when the determination is also based on temperature in the tire 22. Determining load on a wheel on the basis of just pressure or just deformation is not sufficiently reliable because pressure and deformation can change independently due to other factors unrelated to load on the tire. For example, an increase in pressure in combination with a decrease in tire deformation may be indicative that the tire has been re-inflated. For example, an increase in pressure without an associated increase in deformation may be indicative of a change in ambient temperature. However, a change in pressure in combination with a corresponding change in deformation can be indicative of load of the wheel.

Figure 4A:
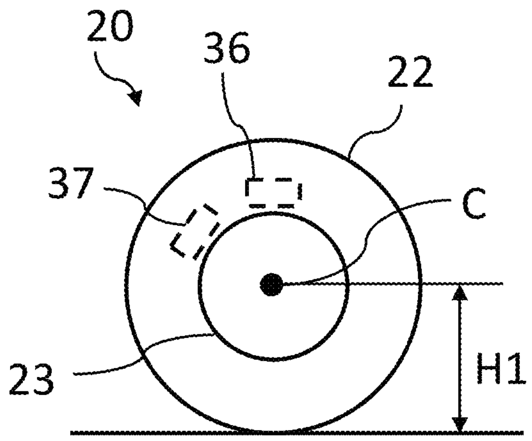
FIG. 4*a* shows a side view of an unloaded tire of the aircraft of FIG. 1.
Figure 5A:
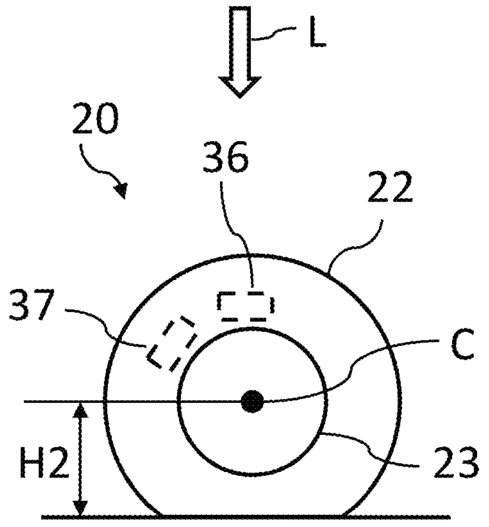
FIG. 5*a* shows a side view of a loaded tire of the aircraft of FIG. 1.
Figure 4B:
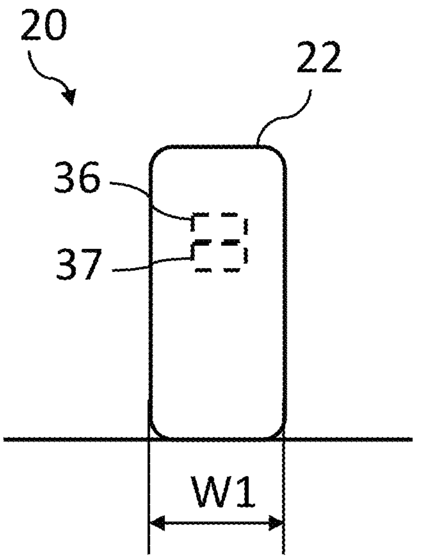
FIG. 4*b* shows a front view of an unloaded tire of the aircraft of FIG. 1.
Figure 5B:
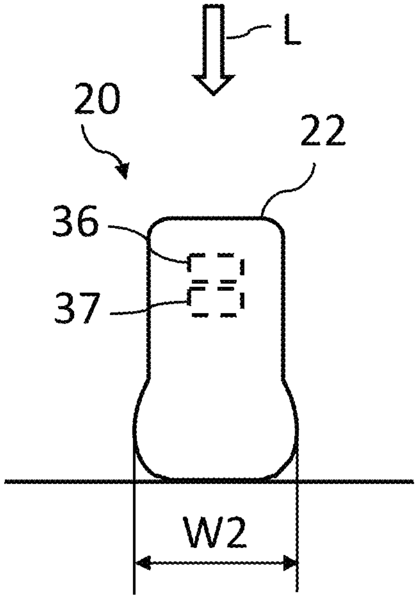
FIG. 5*b* shows a front view of a loaded tire of the aircraft of FIG. 1.

FIGS. 4*a* and 4*b* show a wheel 20 of the aircraft 1 when the aircraft is unloaded. The wheel 20 is slightly flattened at a point of contact with the ground 3, and has a reference width W1 between walls of the tire 22. The wheel 20 is at a reference pressure. FIGS. 5*a* and 5*b* show the wheel 20 of the aircraft 1 when load L, additional to the unloaded weight of the aircraft, is supported by the wheel 20 and when the wheel is at the same temperature as the wheel shown in FIGS. 4*a* and 4*b*. The wheel 20 deflects against the ground 3 under the load L such that the wheel 20 is at a loaded pressure greater than the reference pressure. The load L causes the wheel 20 to flatten against the ground to a greater extent than shown in FIG. 4*a* and walls in the lower half of the wheel 20, closest to the ground 3, to bow outward. The wheel 20 thus has a loaded width W2 between the walls of the tire 22 that is greater than the reference width W1. It will be appreciated that the deformation of the tire 22 of the wheel 20 shown in FIGS. 5*a* and 5*b* is exaggerated for clarity.

Figure 6:
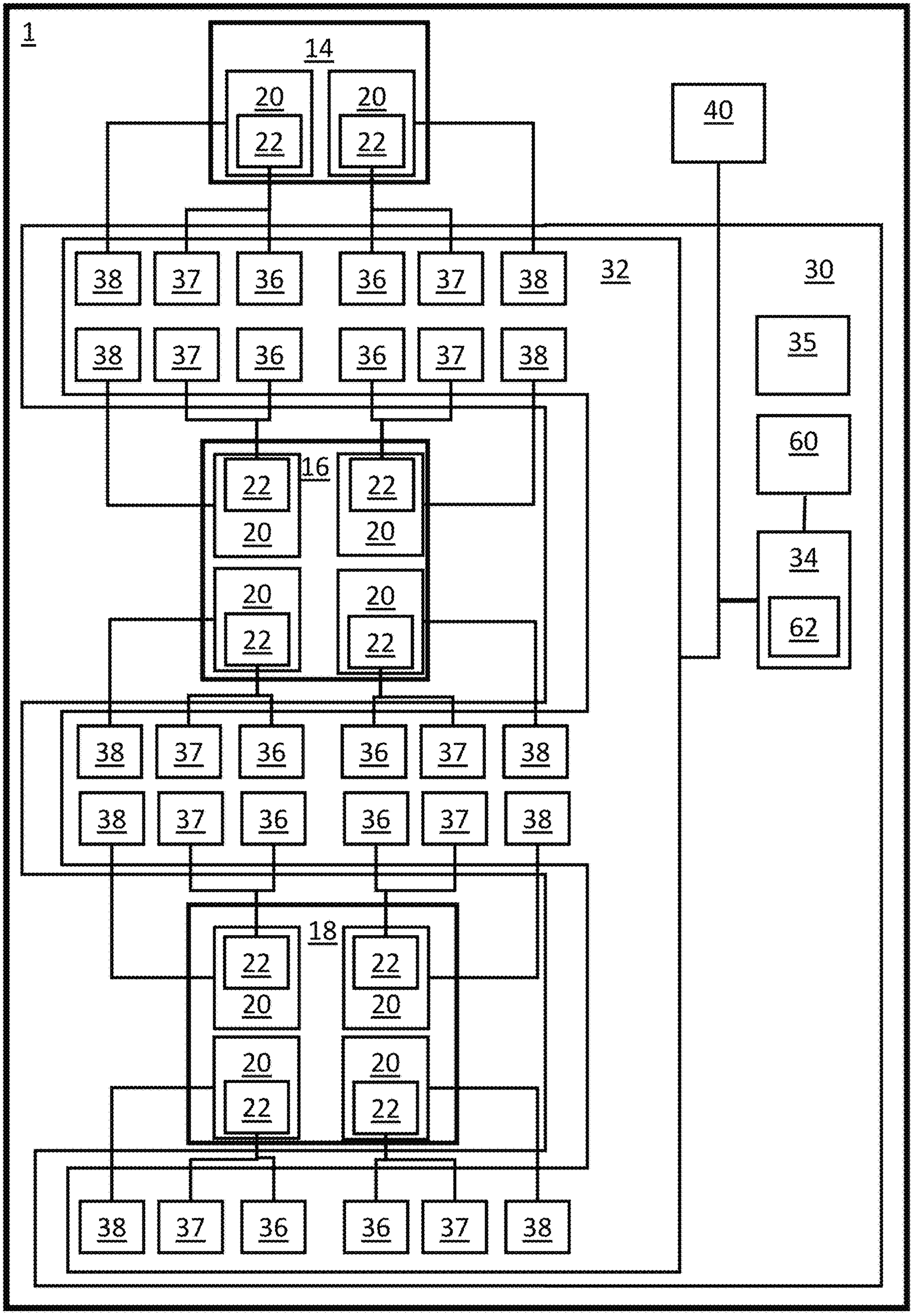
FIG. 6 shows a schematic system view of the aircraft of FIG. 1.

The aircraft 1 comprises a load detection system 30, as shown in FIG. 6. The load detection system 30 comprises a tire monitoring system 32, a controller 34 and a memory 35. In this example, the load detection system 30 is a central aircraft-level system, but in other examples the aircraft 1 comprises a load detection system 30 for each landing gear 14, 16, 18 of the aircraft 1 and a central controller in communication with each controller 34 of the load detection systems 30.

The tire monitoring system 32 has ten pressure sensors 36, ten temperature sensors 37 and ten deformation sensors 38; one pressure sensor 36 and one temperature sensor 37 for each wheel 20 of the aircraft 1. The respective one of the pressure sensors 36 and one of the temperature sensors 37 are fitted to the respective wheel 20, in this example within the respective tire 22. In other envisaged examples, one or both of the respective pressure sensor 36 and temperature sensor 37 are instead fitted on a hub of the respective wheel 20. Each pressure sensor 36 senses pressure in the respective tire 22 once per second and generates a pressure signal once per second indicative of pressure sensed in the respective tire 22. Each temperature sensor 37 senses temperature in the respective tire 22 once per second and generates a temperature signal once per second indicative of temperature sensed in the respective tire 22.

Each deformation sensor 38 is associated with a respective one of the tires 22 of the aircraft 1. In this example, the deformation sensors 38 are cameras that capture an image once per second of the respective tire 22 and transmit the images to the controller 34. The controller 34 comprises a processor 62 that processes the images to determine deformation of the tire 22 and generates respective deformation signals indicative of the deformation of each tire 22 determined by the processor. In this example, the images captured by the deformation sensors 38 each show a respective reference point C, as shown in FIGS. 4*a* and 5*a*, located on a side of the respective wheel 20 at a center of a hub 23 of the wheel 20 around which the tire 22 is fitted, and the ground 3. The processor 62 processes the images to determine a vertical distance between the reference point C and the ground 3, which is indicative of deflection of the tire 22 relative to the ground 3. For an unloaded wheel 20, such as that shown in FIGS. 4*a* and 4*b*, the distance is a reference distance H1, and for a loaded wheel 20, such as that shown in FIGS. 5*a* and 5*b*, the distance is a loaded distance H2 smaller than the reference distance H1. The loaded distance H2 is dependent on the load on the wheel 20. It will be appreciated that, in other examples, each deformation sensor 38 is associated with a respective processor that processes the images captured by the respective camera and transmits a deformation signal indicative of the deformation determined by the processor to the controller 34. It will be appreciated that in other examples, different types of deformation sensors may alternatively be employed, such as proximity sensors.

The controller 34 receives the pressure signals, temperature signals and deformation signals. The controller also receives an ambient temperature signal from another aircraft system 40, indicative of an ambient temperature of the environment surrounding the aircraft 1.

Use of the load detection system 30 is best described with reference to the computer-implemented methods described hereinafter, which may be performed, at least in part, by the load detection system 30. The methods described herein are performed when the aircraft 1 is stationary on the ground, for example before, during or after loading and unloading of the aircraft 1.

Figure 7:
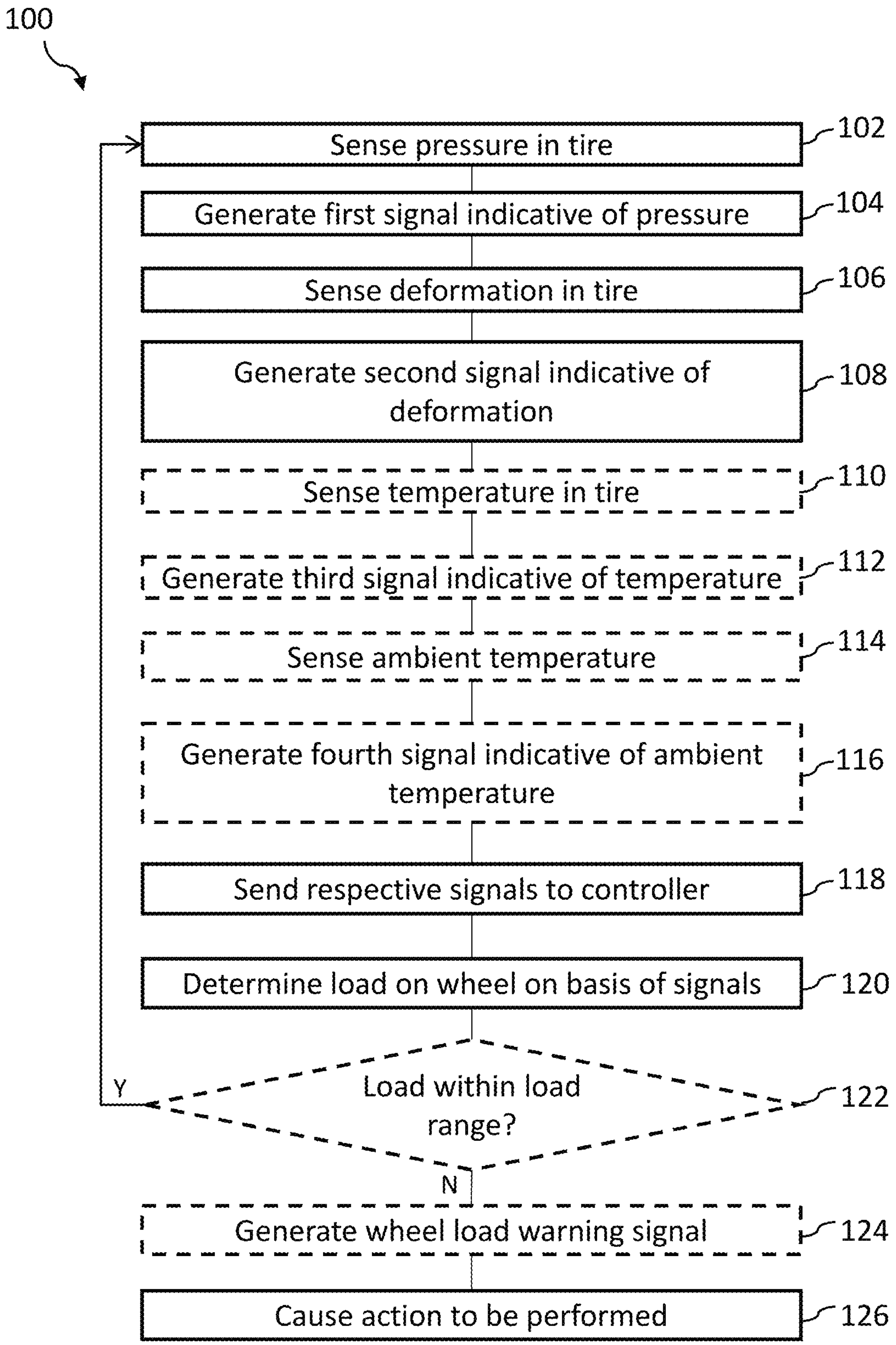
FIG. 7 shows a first method according to an example.

FIG. 7 shows a first computer-implemented method 100 according to an example. The method 100 comprises sensing pressure in a tire of a wheel of an aircraft (block 102) and generating a first signal indicative of pressure sensed in the tire (block 104). In some examples, sensing pressure is performed by the pressure sensors 36 of the load detection system 30.

The method 100 comprises sensing deformation in the tire (block 106) and generating a second signal indicative of deformation sensed in the tire (block 108). In some examples, sensing deformation is performed by the deformation sensors 38 of the load detection system 30.

The method 100 optionally, as denoted by the dashed lines, comprises sensing temperature in the tire (block 110) and generating a third signal indicative of temperature sensed in the tire (block 112). In some examples, sensing temperature is performed by the temperature sensors 37 of the load detection system 30.

The method 100 optionally, as denoted by the dashed lines, comprises sensing ambient temperature (block 114), fluctuations in which influence tire pressure and/or tire deformation, and generating a fourth signal indicative of ambient temperature (block 116).

Sensing of pressure in the tire (block 102), deformation in the tire (block 106) and temperature in the tire (block 108) is performed at regular intervals, in this example once per second. The first and second signals are generated (block 104, 108) each time the pressure and deformation are sensed, and the load on the wheel is determined (block 110).

The method 100 comprises sending the signals to a controller (block 118), and the controller determining a determined load on the wheel on the basis of signals (block 120). In some examples, the controller is the controller 34 of the load detection system 30. A controller is intended to cover any device comprising a computer program capable of determining load on the wheel on the basis of the received signals, for example the controller may comprise a processor or neural network.

The method 100 optionally, as denoted by the dashed lines, comprises the controller determining whether the determined load is within a load range (block 122), generating a wheel load warning signal in the event that the determined load is outside the load range (block 124). In this example, the load range is a dynamic load range updated dynamically on an expected load on the wheel on the basis of a total load on the aircraft. In some other examples, the load range is a predefined load range.

The method 100 comprises performing an action on the basis of the determined load on the wheel (block 126). In this example, the action comprises storing, in a memory, data indicative of the load on the wheel, as determined by the controller, and data indicative of the load on the wheel relative to the predefined load range. In this example, a first wheel load warning signal is generated in the event that the determined load is below the load range and a second wheel warning load signal is generated in the event that the determined load is above the load range. The action comprises transmitting the first wheel warning load signal to a maintenance system operable by ground crew responsible for maintenance of the aircraft, the maintenance system being operable to output, responsive to receiving the first wheel warning load signal, an instruction to the ground crew indicative that the ground crew should inflate the tire. The action comprises the second wheel load warning signal being transmitted to the maintenance system, the maintenance system being operable to output, responsive to receiving the second wheel load warning signal, an instruction to ground crew to check integrity of the wheel responsive to the second wheel warning load signal.

Figure 8:
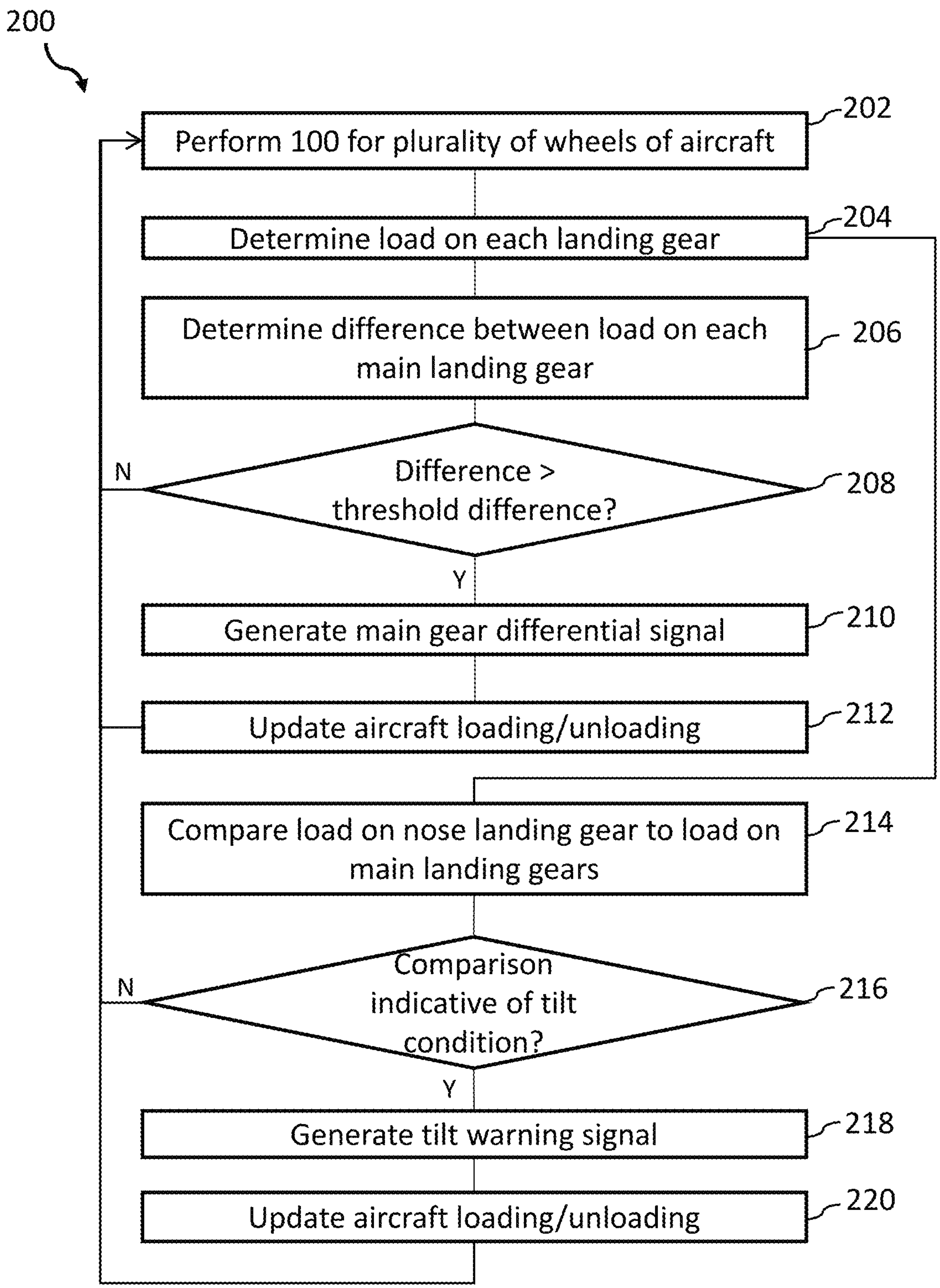
FIG. 8 shows a second method according to an example.

FIG. 8 shows another computer-implemented method 200 according to an example. The method 200 comprises performing the method 100 for a plurality of wheels of the aircraft (block 202). The aircraft in this example is the aircraft 1 described with reference to FIGS. 1 to 6, which has a nose landing gear 14, a first main landing gear 16 and a second main landing gear 18, and the system 30. It will be appreciated that, in other examples, the method 200 may comprise performing the method 100 for only some of the wheels of the aircraft. In this example the plurality of wheels comprises all of the wheels of the aircraft 1, but it will be appreciated that in other examples the plurality of wheels may comprise only some of the wheels of the aircraft, for example just the wheels of the nose landing gear 14, or just the wheels of the main landing gears 16, 18.

The method 200 comprises the controller determining, on the basis of the determined load on each wheel of the first main landing gear, a determined total load on each landing gear (block 204), determining a difference between the determined total load on the first main landing gear and the determined total load on the second main landing gear (block 206), and determining whether the difference exceeds a threshold difference (block 208). In the event that the difference exceeds the threshold difference, the method 200 comprises generating a main gear differential signal (block 210) indicative of uneven loading of the main landing gears 16, 18. The method 200 further comprises automatically updating a plan for an aircraft loading or unloading process in response to the main gear differential signal (block 212) to bring the difference back down to, or below, the threshold difference. In this example, generation of the main gear differential signal causes a display device to display, to a ground crew loading or unloading the aircraft, a different procedure compared to a procedure that is displayed by the display device when the main gear differential signal is not generated. In other examples, updating the plan comprises providing or modifying a recommended action to the ground crew to overcome the load imbalance.

The method 200 comprises comparing the determined total load on the nose landing gear to the determined total load on each of the at least two main landing gears (block 214), determining whether the comparison is indicative that the aircraft is approaching a tilt condition (block 216) and generating a tilt warning signal in the event that the comparing is indicative that the aircraft is approaching a tilt condition (block 218). In this example, the comparing comprised determining a rate of load on the nose landing gear 14 to a rate of change of load on the main landing gears 16, 18 and comparing the rate of change of load on the nose landing gear 14 to the rate of change of load on the main landing gears 16, 18. The comparison is indicative that the aircraft is approaching a tilt condition in the event that the rate of change of load on the nose landing gear is below the rate of change of load on the main landing gear by at least a threshold load change amount.

The method 200 further comprises automatically updating a plan for an aircraft loading or unloading process in response to the tilt warning signal (block 220) at least until the comparison is indicative that the aircraft is not approaching a tilt condition. In this example, generation of the tilt warning signal causes a display device to display, to ground crew loading or unloading the aircraft, a different procedure compared to a procedure that is displayed by the display device when the tilt warning signal is not generated. In other examples, updating the plan comprises providing or modifying a recommended action to the ground crew to overcome the load imbalance.

Although not shown, the method 200 comprises storing, in a memory, data indicative of one or more of: the load on each wheel of the plurality of wheels as determined by the controller, the total load on each landing gear, the difference between the load on each main landing gear, the difference relative to the threshold difference, the comparison between the load on the nose landing gear and the load on the main landing gears, any signal generated during performance of the method 200, and an updated plan for an aircraft loading or unloading process as updated during, or in response to, performance of the method 200.

It will be appreciated that, in other examples, some of the determinations of the method 200 may be performed by a different controller to the controller that performs the method 100 shown in in FIG. 7. It will be appreciated that in some examples, the method 200 omits either blocks 206-212 or blocks 214-220

Figure 9:
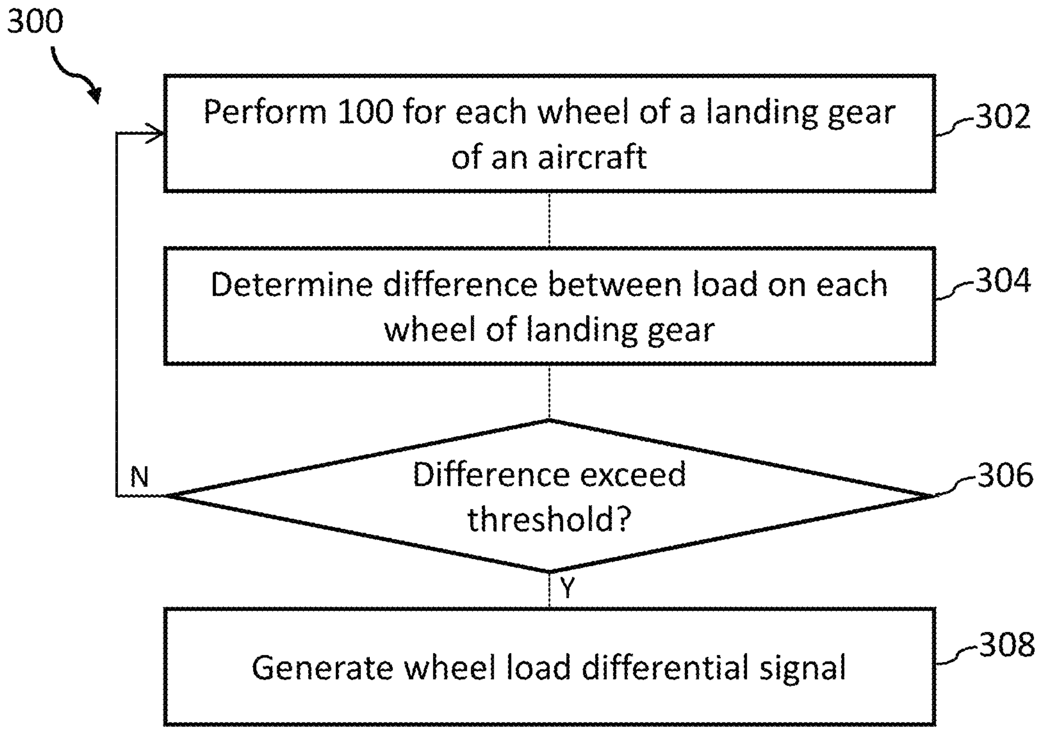
FIG. 9 shows a third method according to an example.

FIG. 9 shows another computer-implemented method 300 according to an example. The method 300 comprises the controller performing the method 100 for each wheel of a landing gear of an aircraft (block 302), for example one of the landing gears 14, 16, 18 of the aircraft 1 described with reference to FIGS. 1 to 6. The method 300 comprises the controller determining a difference between the determined load on each wheel of the landing gear (block 304), determining whether the difference exceeds a threshold difference (block 306), and generating a wheel load differential signal (block 308) in the event that the difference exceeds the threshold difference. The wheel load differential signal is indicative that the difference exceeds the threshold difference, which may be due, for example, to the tires being inflated by different amounts.

Although not shown, the method 300 comprises storing, in a memory, data indicative of one or more of: the load on each wheel of the landing gear as determined by the controller, the difference between the loads on each wheel of the landing gear, the difference relative to the threshold difference, any signal generated during performance of the method 300, and an updated plan for an aircraft loading or unloading process as updated during, or in response to, performance of the method 300.

It will be appreciated that, in other examples, the determinations of blocks 304 and 306 may be performed by a different controller to the controller that performs the method 100 shown in FIG. 7.

Figure 10:
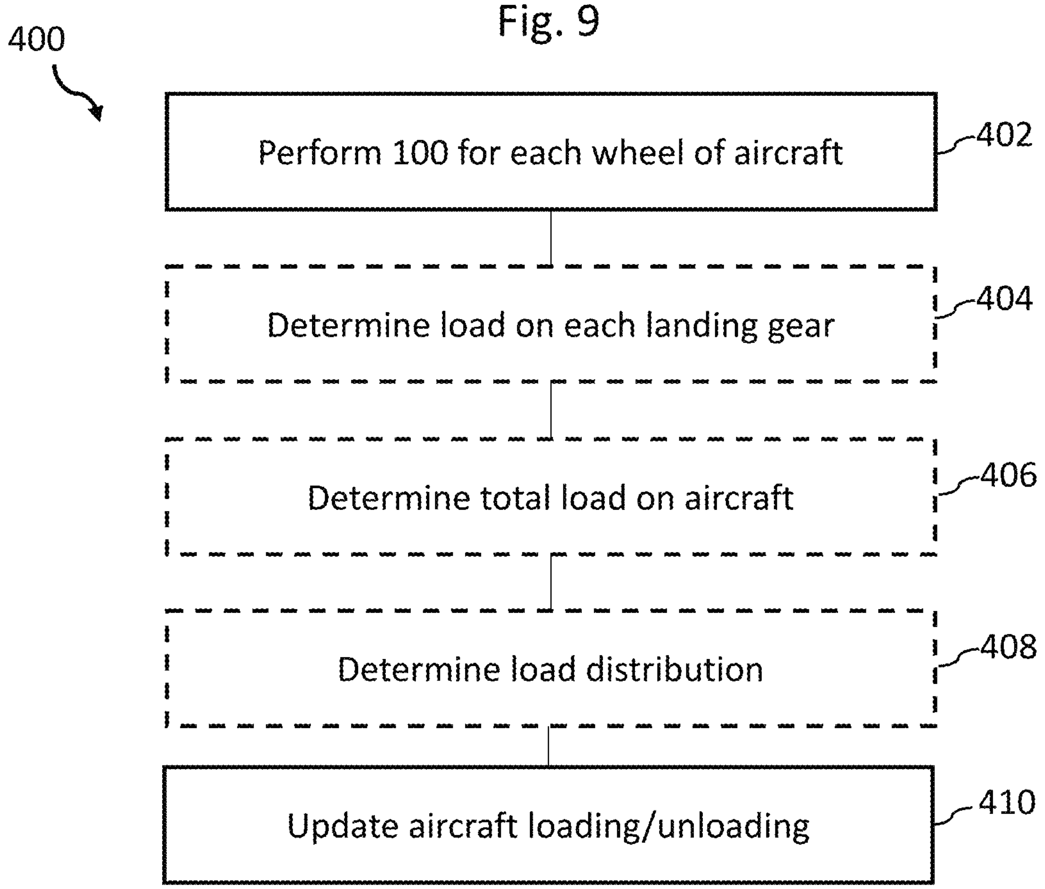
FIG. 10 shows a fourth method according to an example.

FIG. 10 shows another computer-implemented method 400 according to an example. The aircraft in this example is the aircraft 1 described with reference to FIGS. 1 to 6, which has a nose landing gear 14, a first main landing gear 16 and a second main landing gear 18. The method 400 comprises the controller performing the method 100 shown in FIG. 7 for each wheel of the aircraft (block 402). Each wheel may have an associated pressure, temperature and/or deformation sensor. It will be appreciated that, in other examples, the method 400 may comprise performing the method 100 for only some of the wheels of the aircraft. It will be appreciated that in other examples, the method 400 also comprises performing the method 200 shown in FIG. 8.

The method 400 comprises the controller determining a load on each landing gear of the aircraft (block 404) by summing the load on each wheel of the respective landing gear. In other examples, the method 400 also comprises generating respective signals indicative of the total load on each landing gear, the total load on the aircraft, and the load distribution. In other examples, the method 400 also comprises comparing the total load on each landing gear to a threshold landing gear load, and generating a signal indicative of the total load on the landing gear relative to the threshold landing gear load.

The method 400 comprises the controller determining a total load on the aircraft (block 406), by summing the load on each wheel of the aircraft or the load on each landing gear of the aircraft. In other examples, the method 400 comprises comparing the total load on the aircraft to a threshold aircraft load, and generating a signal indicative of the total load on the aircraft relative to the threshold aircraft load.

The method 400 comprises the controller determining a load distribution of the aircraft on the basis of the load on each wheel of the aircraft (block 408). In other examples, the method 400 comprises comparing the load distribution on the aircraft to an expected load distribution, and generating a signal in the event that the load distribution deviates from the expected load distribution. In an example, the expected load distribution is based on how load would be expected to be distributed across the landing gears for an evenly loaded aircraft.

The method 400 comprises updating an aircraft loading or unloading process (block 410) on the basis of one or more of: the load on each wheel, the total load on each landing gear, the total load on the aircraft and the load distribution of the aircraft.

Although not shown, the method 400 comprises storing, in a memory, data indicative of one or more of: the load on each wheel of the aircraft as determined by the controller, the total load on each landing gear, the total load on the aircraft, the load distribution, any signal generated during performance of the method 400, and an updated plan for an aircraft loading or unloading process as updated during, or in response to, performance of the method 400.

It will be appreciated that, in other examples, any of blocks 404-408 may be omitted, as denoted by the dashed lines. It will be appreciated that, in other examples, some of the determinations of the method 400 may be performed by a different controller to the controller that performs the method 100 shown in in FIG. 7.

Figure 11:
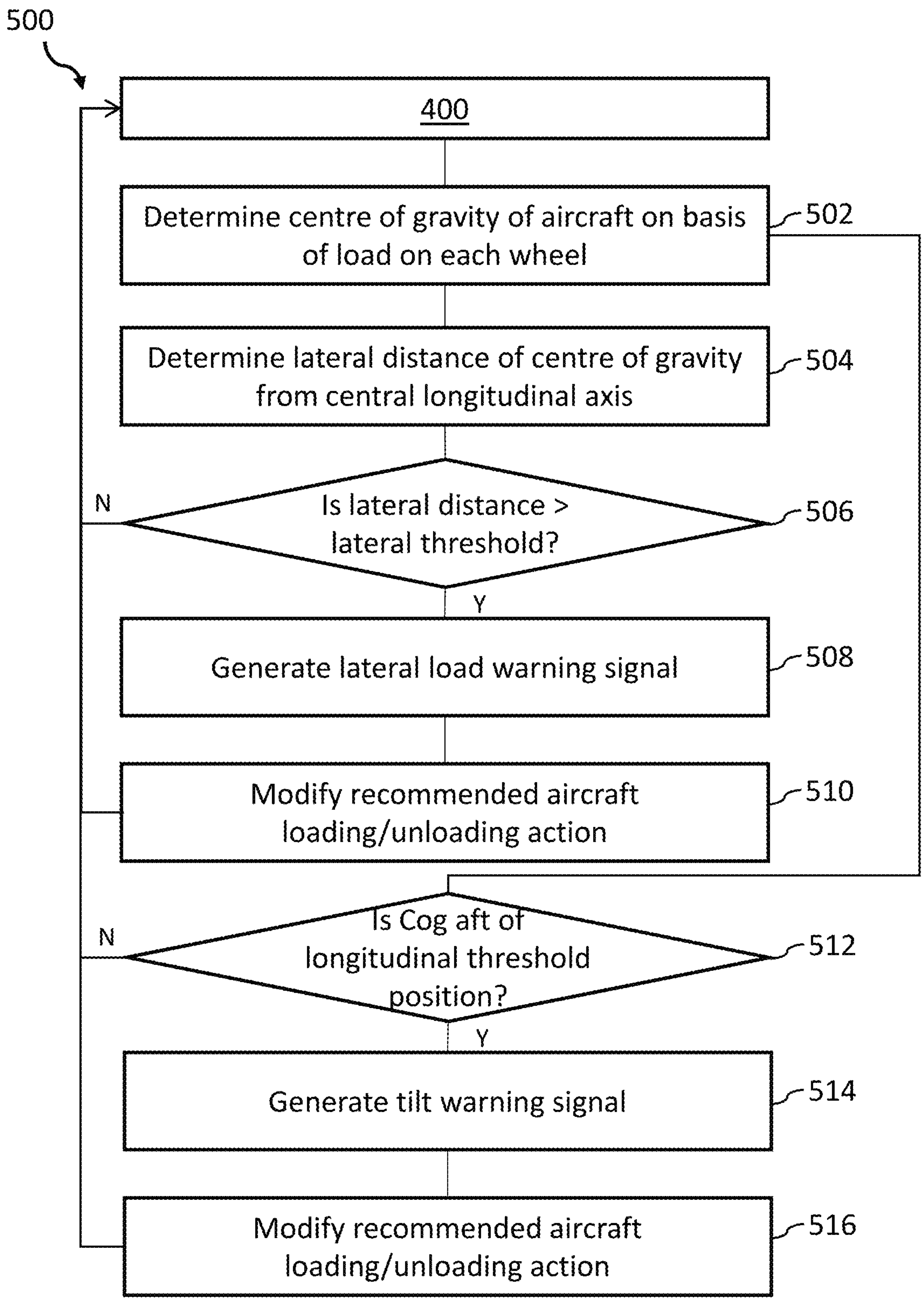
FIG. 11 shows a fifth method according to an example.

FIG. 11 shows another computer-implemented method 500 according to an example. The method 500 comprises performing the method 400 shown in FIG. 10, and determining a center of gravity of the aircraft on the basis of the load on each wheel of the aircraft (block 502). In other examples, the method 500 may instead comprise determining the center of gravity of the aircraft on the basis of the load on each landing gear of the aircraft. It will be appreciated that, in other examples, the method 500 may comprise performing the method 300 shown in FIG. 9 instead of the method 400 shown in FIG. 10.

The method 500 comprises determining a lateral distance between the center of gravity and a central longitudinal axis of the aircraft (block 504), determining whether the lateral distance exceeds a lateral threshold (block 506) and generating a lateral load warning signal in the event that the lateral distance does exceed the lateral threshold (block 508). The method 500 further comprises modifying a recommended aircraft loading or unloading action in response to the lateral load warning signal (block 510) to bring the lateral distance back down to, or below, the lateral threshold.

The method 500 also comprises determining whether the center of gravity is aft of a longitudinal threshold position (block 512) and generating a tilt warning signal in the event that the center of gravity is aft of the longitudinal threshold position (block 514). The method 500 further comprises modifying a recommended aircraft loading or unloading action in response to the tilt warning signal (block 516) to bring the center of gravity in line with, or forward or, the longitudinal threshold position. The longitudinal threshold position may be aft of the theoretical center of gravity, for example position 6 shown in FIG. 3, and may be a distance along the length of the aircraft whereby the aircraft is considered to be at risk of tilt if the center of gravity passes aft of the longitudinal threshold position.

Although not shown, the method 500 comprises storing, in a memory, data indicative of one or more of: the determined center of gravity, the lateral distance, the lateral distance relative to the threshold, the center of gravity relative to the longitudinal threshold position, any signal generated during performance of the method 500, and an updated recommendation for an aircraft loading or unloading action as updated during, or in response to, performance of the method 500.

It will be appreciated that, in other examples, some of the determinations of the method 500 may be performed by a different controller to the controller that performs the method 100 shown in in FIG. 7. It will be appreciated that in some examples, the method 500 omits either blocks 504-510 or blocks 512-516.

With reference to the computer-implemented methods 100-500 described herein, updating a plan for an aircraft loading or unloading process comprises issuing instructions at a ground crew user interface, on the basis of determinations made during the method, the instructions causing ground crew of an aircraft to redistribute load within the aircraft and modifying a planned sequence for cargo and/or passengers to be loaded or unloaded from the aircraft.

With respect to any of the methods 100-500, the aircraft may be the aircraft 1 discussed herein with reference to FIGS. 1 to 6, and the methods 100-500 may be performed, at least in part, by the load detection system 30 of the aircraft 1. In this example, the aircraft 1 comprises a non-transitory storage medium 60 and a processor 62, the non-transitory storage medium 60 storing machine-readable instructions which, when executed by the processor 62, cause the processor 62 to initiate any one of the methods 100-500 disclosed herein.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method comprising:
determining, based on a first signal indicative of a pressure in a tire of a wheel of an aircraft and a second signal indicative of a deformation of the tire, a compensated load on the wheel, wherein the deformation is relative to a reference deformation corresponding to an unloaded condition of the aircraft and comprises a change in tire width compared to when the aircraft is unloaded;
determining the reference deformation based on sensor data obtained when the aircraft is in the unloaded condition;
determining the compensated load on the wheel based on relationships between the first signal, the second signal, a third signal indicative of a temperature of the tire, and the reference deformation, wherein the relationships are further based on data indicative of one or more of wear on the tire, whether the tire has been re-treaded, and a position of the tire on the aircraft;
comparing the compensated load on the wheel to a reference wheel load, the reference wheel load being a maximum allowable wheel load above which the wheel should not be loaded; and
causing an action to be performed based on the compensated load on the wheel, wherein the action comprises modifying a recommended aircraft loading or unloading operation.

2. The computer-implemented method according to claim 1, further comprising:
sensing the pressure in the tire and generating the first signal based on the sensed pressure.

3. The computer-implemented method according to claim 1, further comprising:
sensing the deformation of the tire and generating the second signal based on the sensed deformation of the tire, wherein the sensing the deformation of the tire comprises sensing one or both of:
(i) a change in tire width relative to an unloaded condition; and
(ii) a deflection of the tire relative to a surface on which the tire is located.

4. The computer-implemented method according to claim 1, further comprising:
determining a determined load on a plurality of wheels of the aircraft, based on respective first signals indicative of a pressure in a tire of each respective wheel of the plurality of wheels and respective second signals indicative of a deformation of each respective tire of each wheel of the plurality of wheels, wherein the plurality of wheels comprises the wheel, and
causing the action to be performed based on the determined load on each wheel of the plurality of wheels.

5. The computer-implemented method according to claim 4, wherein the plurality of wheels comprises all wheels of a landing gear of the aircraft and method comprises:
determining, based on the determined load on each wheel of the landing gear, a determined total load on the landing gear, and
causing the action to be performed based on the determined total load on the landing gear.

6. The computer-implemented method according to claim 4, wherein the plurality of wheels comprises all wheels of a first main landing gear of the aircraft and all wheels of a second main landing gear of the aircraft, the first and second main landing gears on opposing sides of a central longitudinal axis of the aircraft, and
wherein the method comprises:
determining, based on the determined load on each wheel of the first main landing gear, a determined total load on the first main landing gear;
determining, based on the determined load on each wheel of the second main landing gear, a determined total load on the second main landing gear;
comparing the determined total load on the first main landing gear to the determined total load on the second main landing gear, and
causing the action to be performed based on the comparing of the determined total load on the first main landing gear to the determined total load on the second main landing gear.

7. The computer-implemented method according to claim 4, wherein the plurality of wheels comprises all wheels of the aircraft.

8. The computer-implemented method according to claim 7, comprising:
determining, based on the determined load on each wheel of the aircraft, a respective determined total load on each landing gear of the aircraft, and
causing the action to be performed based on the determined total load on each landing gear of the aircraft.

9. The computer-implemented method according to claim 8, wherein the aircraft comprises a nose landing gear and at least two main landing gears positioned aft of the nose landing gear, and wherein the method further comprises:

comparing the determined total load on the nose landing gear to the determined total load on each of the at least two main landing gears, and causing the action to be performed based on the comparing of the determined total load on the nose landing gear to the determined total load on each of the at least two main landing gears.

10. The computer-implemented method according to claim 8, further comprising:

determining, based on either the compensated load on each wheel of the aircraft or the determined total load on each landing gear of the aircraft, a determined total load on the aircraft, and causing the action to be performed based on the determined total load on the aircraft.

11. The computer-implemented method according to claim 8, further comprising:

determining, based on either the compensated load on each wheel of the aircraft or the determined total load on each landing gear of the aircraft, a load distribution of the aircraft, and causing the action to be performed based on the load distribution of the aircraft.

12. The computer-implemented method according to claim 8, comprising:

determining, based on the compensated load on each wheel of the aircraft or based on the determined total load on each landing gear of the aircraft, a determined center of gravity of the aircraft, causing the action to be performed based on the determined center of gravity of the aircraft, further comprising at least one of:

determining a lateral distance between the determined center of gravity of the aircraft and a central longitudinal axis of the aircraft, determining whether the lateral distance exceeds a lateral threshold, and generating a lateral load warning signal when the lateral distance exceeds the lateral threshold; and comparing the determined center of gravity to a longitudinal threshold position, the longitudinal threshold position aft of a theoretical center of gravity of the aircraft, determining whether the determined center gravity is aft of the longitudinal threshold position, and generating a tilt warning signal when the determined center gravity is aft of the longitudinal threshold position.

13. The computer-implemented method according to claim 1, wherein the action further comprises one or more of:

storing data received during the method, or data indicative of a determination made during the method, or a combination thereof in a memory local to the aircraft, or a memory remote from the aircraft, or both;

transmitting a signal indicative of a determination made during the method to one or more systems of the aircraft, or systems remote from the aircraft, or both;

transmitting a signal generated during the method to one or more systems of the aircraft, systems remote from the aircraft, or both;

redistributing load on the aircraft; and updating a plan for an aircraft loading or unloading process based on a determination made during the method.

14. A non-transitory storage medium storing machine-readable instructions which, when executed by a controller, cause the controller to initiate the computer-implemented method according to claim 1.

15. The computer-implemented method according to claim 1, further comprising comparing the compensated load on the wheel to a compensated load on at least one other wheel and generating an inconsistency signal when a difference between the compensated load on the wheel and the compensated load on the at least one other wheel exceeds a threshold.

16. The computer-implemented method according to claim 1, wherein the reference deformation corresponds to a deformation of the tire when the aircraft is unloaded and the tire is not supporting weight of the aircraft on a ground surface.

17. The computer-implemented method according to claim 1, wherein the change in tire width is determined relative to a reference tire width corresponding to the unloaded condition of the aircraft.

18. A system for an aircraft, the system comprising:

a monitoring system configured to detect a pressure and a deformation of a tire of a wheel of the aircraft wherein the deformation is relative to a reference deformation corresponding to an unloaded condition of the aircraft, and comprises a change in tire width compared to when the aircraft is unloaded, and configured to detect a temperature of the tire, and a controller configured to determine, based on the pressure and the deformation detected by the monitoring system, a compensated load on the wheel, wherein the controller is further configured to determine the reference deformation based on sensor data obtained when the aircraft is in the unloaded condition, wherein the controller is configured to determine the compensated load on the wheel based on relationships between the pressure, the deformation, temperature of the tire, and the reference deformation, wherein the relationships are further based on data indicative of one or more of wear on the tire, whether the tire has been re-treaded, and a position of the tire on the aircraft, wherein the controller is further configured to compare the compensated load on the wheel to a reference wheel load, the reference wheel load being a maximum allowable wheel load above which the wheel should not be loaded, and wherein the monitoring system is configured to cause an action to be performed based on the compensated load on the wheel determined by the controller, the action comprising modifying a recommended aircraft loading or unloading operation.

19. The system according to claim 18, wherein the monitoring system is configured to detect pressure and deformation of a tire of each wheel of a landing gear of the aircraft, and the controller is configured to:

determine, based on the pressure and deformation detected by the monitoring system for each tire, a compensated load on each wheel of the landing gear; and determine a determined total load on the landing gear, wherein the monitoring system is configured to cause the action to be performed on the basis of the determined total load on the landing gear.

20. The system according to claim 18, wherein the monitoring system is configured to detect a pressure and a deformation of a tire of each wheel of the aircraft, and the controller is configured to:

determine, based on the pressure and the deformation detected by the monitoring system for each tire, a compensated load on the respective wheel; and determine a determined center of gravity of the aircraft, wherein the monitoring system is configured to cause the action to be performed based on the determined center of gravity of the aircraft.

21. The system according to claim 20, wherein the controller is configured to compare the determined center of gravity to a theoretical center of gravity of the aircraft, and the action comprises the monitoring system outputting a signal indicative of a position of the determined center of gravity relative to the theoretical center of gravity.

22. An aircraft comprising:

at least one landing gear, each landing gear comprising at least one wheel having a tire, and one or more of:

the system according to claim 18, and, a non-transitory storage medium storing machine-readable instructions which, when executed by a controller, cause the controller to initiate a computer-implemented method comprising determining, based on a first signal indicative of the pressure in the tire of the wheel of the aircraft and a second signal indicative of a deformation of the tire, a compensated load on the wheel, and causing an action to be performed based on the compensated load on the wheel.

* * * * *